April 23, 1968  R. E. J. PUTMAN  3,379,421
CONTROL OF MATERIAL PROCESSING DEVICE
Filed Dec. 14, 1966

WITNESSES:
Bernard R. Gieguey
James F. Young

INVENTOR
Richard E. J. Putman
BY  J.W.Brodahl
ATTORNEY

United States Patent Office 3,379,421
Patented Apr. 23, 1968

3,379,421
CONTROL OF MATERIAL PROCESSING DEVICE
Richard E. J. Putman, Pittsburgh, Pa., assignor to Westinghouse Electric Corporation, Pittsburgh, Pa., a corporation of Pennsylvania
Filed Dec. 14, 1966, Ser. No. 601,618
4 Claims. (Cl. 259—154)

ABSTRACT OF THE DISCLOSURE

The determination of a desired relationship involving an unknown condition of a fluid or a solid relative to a fluid in respect to an industrial process to be controlled, such as the illustrated operation of a grinder device, is described. A measurement of such unknown condition is accomplished through a sensed change in another condition of the process resulting from the effecting of a known quantity of additive material into the established process operation. Measurements are made of more readily measured conditions of the process to enable the establishment of the desired unknown condition.

---

The present invention relates to the industrial process control apparatus for determining the value of an unknown flow of a fluid or the unknown flow of a solid into a fluid in relation to some industrial process to be controlled.

There are many instances in the field of automatic industrial process control where a knowledge of the flows of solids or fluids relative to the operation of a process is desirable but where the flows are very difficult to directly measure because of the nature of the application.

It is an object of the present invention to provide an improved measurement technique for the determination of an unknown flow of a fluid or a solid into a fluid.

It is another object of the present invention, for the particular application to control the operation of a material grinding device, to better control that grinding device for maximizing the amount of material passed through the grinding device for any given desired output material particle size.

In accordance with the present invention the unknown flow of a fluid or a solid into a fluid that is to be measured is determined by means of a predetermined calculation on a real time basis through the inferential establishment of the change in measured density resulting from the introduction of a known quantity of additive material into the material flow pattern.

The present invention utilizes inferential techniques which were not as practical prior to the availability of on-line digital type process control computers for such application. It includes the utilization of measuring instruments operative to provide enough data relative to the more readily measured variables to enable the predetermined computations to be carried out in order to establish the magnitude of the desired unknown variable. The principle may also be used to predict the value of any other desired term in these expressions provided the remaining terms are known, but the most significant use of the method will be for the determination of unknown flows. The technique of the present invention assumes a mathematical relationship between an injected flow of known magnitude and analysis and the effect of this on the resulting mixture analysis.

These and other objects and advantages of the present invention will be better understood in view of the following more detailed description including the drawings, wherein.

Figure 1:
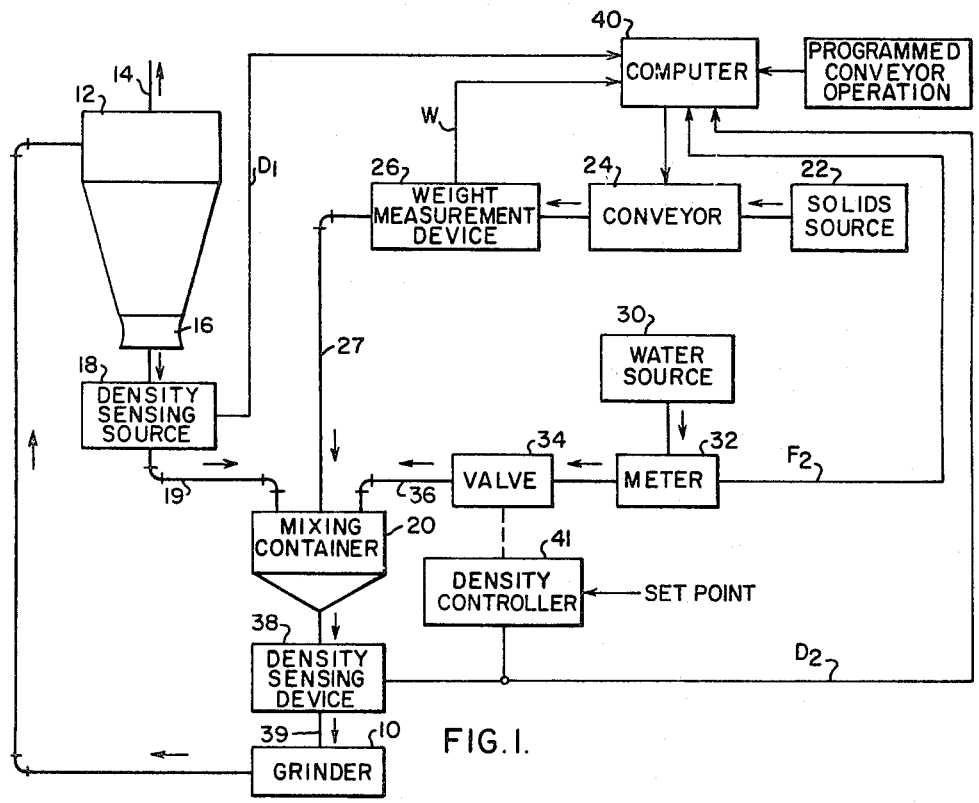
FIGURE 1 is a diagrammatic illustration of an application of the present invention to measure the flow of solids in a fluid slurry discharging from the bottom apex valve of a cyclone classifier device operative with a mineral ore grinding device.

In FIG. 1 there is shown a grinder 10 operative to grind mineral ore materials in a slurry form and to supply these to a well known cyclone classifier device 12, with the desired particle size overflow output of the classifier device 12 passing through an output conduit 14 leading to subsequent processing applications. The bottom apex valve 16 of the classifier device is connected to return back to the grinder the material having a particle size greater than the desired output particle size intended to overflow into the output conduit 14. This greater particle size material slurry passes through a density sensing device 18 and a conduit 19 into a mixing container 20. In the mixing container 20 there are mixed additive solid materials from a solids source 22 in an amount determined by the controlled operation of the conveyor 24 and which pass through a weight measurement device 26 before entering the mixing container 20. Additionally water from a water source 30 passing through a meter 32 and a flow control valve 34 enters the mixing container through the conduit 36. The output from the mixing container 20 in the form of a fluid slurry passes through a density sensing device 38 before returning to the grinder 10.

The density sensing device 18 provides a control signal in accordance with the output density $D_1$ from the classifier device 12, which control signal is applied to a computer 40. The density sensing device 38 is operative to supply to the computer 40 and to a density controller 41 a control signal $D_2$ in accordance with the output density of the slurry leaving the mixing container 20. The weight measurement device 26 is operative to supply a control signal W to the computer in accordance with the measured weight of the solids passing into the mixing container through the conduit 27 in a predetermined period of time. The meter 32 is operative to supply a control signal $F_2$ to the computer 40 in accordance with the flow of water addition to the mixing container in terms of lbs./min. It is desired to determine the unknown flow $F_1$ of slurry from the conduit 19 entering the mixing container 20 in terms of lbs./min.

Figure 2:
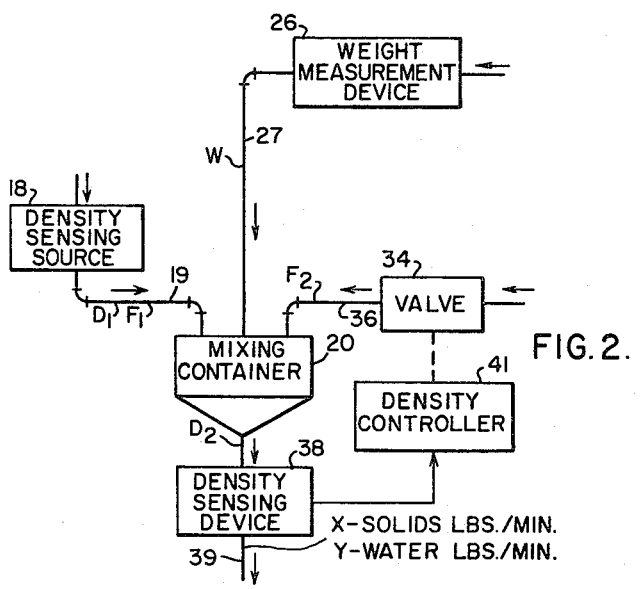
FIG. 2 is a symbolic illustration of a general application of the present invention.

In FIG. 2 there are shown the mixing container 20, the density controller 41 and its associated valve 34, and the density sensing device 38. There is fed into the mixing container 20, a slurry having a density $D_1$ and an unknown flow $F_1$, to be determined by the computer, from the underflow of the cyclone classifier device 12. There is fed into the mixing container 20, W lbs./min. of solids from the solids source. The resulting mixture leaving the mixing container 20 has a density $D_2$ and includes X lbs./min. of solids and Y lbs./min. of water.

In mineral beneficiation plants, large volumes of slurries often have to be handled but their flow is frequently too expensive to measure owing to the cost and size of the flow measuring equipment required to specifically do this. Density of the involved slurry, however, is much easier and less expensive to measure. To determine the desired value of the unknown flow $F_1$ of the large volume of slurry passing through the bottom apex valve 16 of the cyclone classifier device 12 and through the conduit 19 into the mixing container 20, the computer 40 would respond to the density signal from the density sensing device 18 to in effect sense the density $D_1$ of the slurry prior to water injection within the mixing container 20. The water from the water supply 30, in passing through the meter 32, has its flow rate $F_2$ measured by the meter 32 and provides a signal $F_2$ to the computer 40 in accordance with the flow rate of the water passing through the valve 34. The computer senses the density signal $D_2$ in accordance with the density of the slurry in the output of the mixing container 20 by means of the density sensing device 38. The computer now calculates the flow $F_1$ of the slurry passing through apex valve 16 from a knowledge of the water flow rate $F_2$ and the density quantities $D_1$ and $D_2$. The specific formula relationship to be used here by the computer will be explained below.

One objective of the present control system shown in FIG. 1 is to maximize the mineral desired particle size throughout relative to the operation of the grinder 10 for a given desired particle size. If the cyclone classifier device 12 recycles more than optimum of the slurry received from the grinder 10 less new input of solids from solid source 22 is needed, and if the cyclone device 12 recycles less than optimum of the slurry received from the grinder 10 more new input solids are needed from the solid source 22. The control system shown in FIG. 1 has particular application to a closed milling arrangement preceded by magnetic separators, or for determining the solids in the white water at the feed end of a paper machine.

As a specific and illustrative example to more clearly set forth the teachings of the present invention, and applicable to the determination of an unknown solids flow $S_1$ of taconite slurry through the conduit 19, the density controller 41 is made operative to regulate the density $D_2$ of the slurry within the mixing container 20. The following relationship can be established:

$$D_1 = \frac{62.3}{1 - 0.8c_1}$$

where $C_1$ is the percent solids by weight in the slurry passing through the conduit 19 from the cyclone classifier device and $D_1$ is the measured density. We can solve for $C_1$ as follows:

$$C_1 = \frac{1}{0.8}\left(1 - \frac{62.3}{D_1}\right) \quad (1)$$

It is generally known that $D_1$ is 119 lbs./ft.$^3$ when $C_1$ is 60% for a taconite slurry, and Equation 1 above is satisfied for these values Now, taking a material balance, the unknown solids flow per minute present in the conduit 39 equals the added solids plus the solids in the recycled slurry and can be set forth as follows:

$$X = W + \frac{62.3}{0.8}F_1\left(\frac{D_1}{62.3} - 1\right)$$

where $F_1$ is the unknown slurry flow in the conduit 19 recycled from the under flow of the cyclone classifier and W is the solids per minute added from solids source 22.

The water flow per minute in slurry leaving the mixing container 20 equals:

$$Y = 62.3 F_2 + F_1 D_1 - \left[\frac{62.3}{0.8}F_1\left(\frac{D_1}{62.3} - 1\right)\right]$$

where $62.3 F_2$ is the mass flow rate of water through conduit 36.

$F_1 D_1$ is the mass flow rate of the total slurry through the conduit 19, and the mass flow rate of the solids in that slurry in conduit 19 is the third quantity.

The concentration or percent solids by weight of solids in the stream leaving the mixing container 20 is as follows:

$$C_2 = \frac{1}{0.8}\left(1 - \frac{62.3}{D_2}\right) = \frac{X}{X+Y} \quad (2)$$

Above Equation 2 represents the total amount of solids divided by the sum of the total amount of solids plus water. The computer can calculate the value of $C_1$ from Equation 1 since $D_1$ is measured and can calculate the value of $C_2$ from Equation 2 since $D_2$ is measured.

Knowing the value of $D_1$ from the density sensing device 18, the above equation for X can be simplified as follows:

$X = W + K_1 F_1$ where $K_1$ is some constant that can be determined by the computer since $D_1$ is measured. Similarly, the above equation for Y can be simplified as follows: $Y = K_2 F_2 + F_1(K_3 - K_1)$, where $F_2$ is provided by the meter 32 shown in FIG. 1. The computer can establish the values of $K_1$ and $K_2$ and $K_3$. The Equation 2 for $C_2$ can now be rewritten as follows:

$$C_2 = \frac{X}{X+Y} = \frac{W + K_1 F_1}{W + K_1 F_1 + K_2 F_2 + F_1(K_3 - K_1)}$$
$$= \frac{W + K_1 F_1}{W + K_2 F_2 + F_1 K_3}$$

in which $F_1$ is the only unknown quantity, so the computer can solve this equation for $F_1$.

For the determination of the unknown solids under flow $S_1$ from the cyclone classifier 12, where we know that $$S_1 = C_1 D_1 F_1$$

the computer can now solve this equation for $S_1$, the desired amounts of solids under flow from the cyclone classifier since $C_1$ and $D_1$ are known and $F_1$ has just been determined.

The computer is here intended to be operative in a sampling manner to periodically determine the values $F_1$ and $S_1$ so often as required for the optimum control of the operation of the grinder 10. Knowing $S_1$, the quantity $S_1 + W$ can be calculated and the computer can now hold this quantity substantially constant by regulation of W.

A more general example not particular to taconite to set forth the teachings of the present invention, would be to define the quantity $C_1$, such as previously shown by Equation 1, in terms of $\rho$ the specific gravity of the solids in the slurry. The weight $W_1$ of the solids in one cubic foot of slurry is as follows:

$$W_1 = C_1 D_2$$

The weight of the water $W_2$ in the slurry is as follows:

$$W_2 = D_1(1 - C_1)$$

The volume of the solids $V_1$ is as follows:

$$V_1 = W_1/62.3\rho = C_1 D_1/62.3\rho$$

The volume of the water $V_2$ is as follows:

$$V_2 = W_2/62.3 = D_1(1 - C_1)/62.3$$

Since $$V_1 + V_2 = 1 = \frac{C_1 D_1}{62.3\rho} + \frac{D_1(1 - C_1)}{62.3}$$

And from this it can be derived that $$D_1 = \frac{62.3}{1 - C_1\left(1 - \frac{1}{\rho}\right)}$$

and $$C_1 = \frac{1}{\left(1 - \frac{1}{\rho}\right)}\left(1 - \frac{62.3}{D_1}\right)$$

The present invention disclosed herein is related to a co-pending patent application Ser. No. 601,608, filed Dec. 14, 1966 by the same inventor and assigned to the same assignee.

In general, it should be noted that the embodiment of the present invention herein described has been applied to the determination of the unknown flow $F_1$ without the requirement of a magnetic flow measuring device and with the employment of the solids weight measurement device 26. However, if instead it is desired to not require the weight measurement device 26, operative to measure the weight of the solids material from the solids source 22, a magnetic flow measuring device can be used to measure the flow $F_1$ and the computer can then employ the above equation for $C_2$ to calculate the only remaining unknown quantity W. The solids flow $S_1$ is still calculated by the computer, and the quantity $S_1+W$ in pounds per minute is held substantially constant by suitable regulation of the added solids W by the computer.

While a preferred embodiment of the present invention has been illustrated and described herein, the present invention is not to be limited thereto in that many modifications are within the scope of the present teachings.

What is claimed is:

1. In control apparatus for a material processing device operative with the supply of an input slurry and the supply of new material, the combination of
    material mixing means, through which said input slurry passes after mixing with said new material,
    first condition determination means for providing a first control signal in accordance with a first condition of said input slurry which enters said material mixing means,
    second condition determination means for providing a second control signal in accordance with a second condition of the mixed material slurry leaving said material mixing means,
    new material supply control means for controlling the supply of new material to said material mixing means,
    and regulation means responsive to said first and second signals for regulating the operation of said control means for controlling the supply of new material to said material mixing means in relation to a sensed change in said second condition resulting from the supply of said new material to said material mixing means for the purpose of maintaining a predetermined relationship between the supply of said input slurry and the supply of said new material.

2. The control apparatus of claim 1, with said first condition being the density of said input slurry and with said second condition being the density of the mixed material slurry leaving the material mixing means, and with said regulation means being operative to maintain substantially constant the sum of the input slurry solids flow and the supply rate of said new material.

3. The control apparatus of claim 1, including measurement means operative to measure a selected condition of a predetermined one of said input slurry and said supply of new material for supplying a third control signal in accordance with said selected condition, with said regulation means also being responsive to said third control signal for controlling the supply of new material.

4. In measurement apparatus operative to determine the flow of an input fluid, the combination of first condition sensing means operative with said input fluid for providing a first control signal in accordance with a first condition of that input fluid, materials mixing means for receiving said input fluid and for providing a mixed output fluid, water supply means for supplying a known flow of water to said materials mixing means, solids supply means for supplying a known weight of solids material to said mixing means, second condition sensing means operative with said output fluid from the mixing means for providing a second control signal in accordance with a second condition of that output fluid, and flow computation means responsive to said control signals for providing an operation signal in accordance with a predetermined relationship between said control signals, said water flow and said known weight of solids material, and control means operative with said solids supply means for varying the weight of solids supplied to said mixing means in accordance with said operation signal.

References Cited

UNITED STATES PATENTS 3,170,677   2/1965   Phister et al. _____ 259—54

ROBERT W. JENKINS, *Primary Examiner.*